US005299607A

United States Patent [19]

Monticup, Jr.

[11] Patent Number: 5,299,607

[45] Date of Patent: Apr. 5, 1994

[54] GASOLINE NOZZLE WITH RETROFITTED EMERGENCY SHUT-OFF VALVE

[76] Inventor: Anthony T. Monticup, Jr., 3 Martin Ct., Clifton Park, N.Y. 12065

[21] Appl. No.: 981,213

[22] Filed: Nov. 25, 1992

[51] Int. Cl.[5] ........................ B67D 5/373; F16K 17/14; F16K 13/04

[52] U.S. Cl. ........................ 141/208; 141/392; 141/59; 137/68.1; 137/71; 285/4

[58] Field of Search .................. 141/392, 59, 206–209, 141/210, 211, 214–215, 217, 218, 227, 228; 137/68.1, 71; 285/3, 4

[56] References Cited

U.S. PATENT DOCUMENTS

| | | | |
|---|---|---|---|
| 3,916,929 | 11/1975 | Brown | 137/68.1 |
| 4,008,738 | 2/1977 | Moskovich | 141/392 X |
| 4,646,773 | 3/1987 | Klop et al. | 137/68.1 |
| 4,697,624 | 10/1987 | Bower et al. | 141/208 |
| 4,854,338 | 8/1989 | Grantham | 137/68.1 |
| 4,899,792 | 2/1990 | Podgers | 141/382 |
| 5,004,023 | 4/1991 | Monticup, Jr. et al. | 141/208 |
| 5,067,533 | 11/1991 | Carder, Sr. | 141/392 |
| 5,099,870 | 3/1992 | Moore et al. | 137/71 |

*Primary Examiner*—Ernest G. Cusick
*Attorney, Agent, or Firm*—H. Jay Spiegel

[57] ABSTRACT

An emergency shut-off valve is designed to be retrofitted into an existing gasoline nozzle by interposing the shut-off valve between the handle assembly and nozzle assembly of an existing gasoline dispensing nozzle. The inventive shut-off valve is spring biased in a closing direction and is held open by a protrusion extending proximal of the nozzle portion of the existing gasoline dispensing nozzle so that with the shut-off valve assembled between the existing handle assembly and nozzle assembly, the valve is held open. A sleeve having a weakened annulus holds the nozzle assembly onto the shut-off valve. If a driver drives away from a gasoline dispensing pump with the nozzle remaining within the gas tank opening, the weakened area fails allowing the sleeve to separate and the nozzle assembly to remove itself from the shut-off valve causing the shut-off valve to instantaneously close preventing fuel spillage. Embodiments of vapor recovery structure are also disclosed.

15 Claims, 4 Drawing Sheets

GASOLINE NOZZLE WITH RETROFITTED EMERGENCY SHUT-OFF VALVE

BACKGROUND OF THE INVENTION

The present invention relates to a gasoline nozzle with retrofitted emergency shut-off valve. In the prior art, it is known to provide a gasoline dispensing nozzle with a system designed to prevent fuel spillage should the nozzle be broken off. Applicant herein is co-inventor of the invention disclosed in U.S. Pat. No. 5,004,023, which patent discloses an entirely new gasoline dispensing nozzle having an emergency shut-off valve activated should the nozzle break off the handle. While the device disclosed in this patent is effective for its intended purpose, Applicant has discovered that it is advantageous to provide an emergency shut-off valve which may be retrofitted into nozzles which are commonly used to dispense fuels such as gasoline and diesel fuel at service stations. It is with this idea in mind that the present invention was developed.

The following additional prior art is known to Applicant:

U.S. Pat. No. 4,646,773 to Klop et al. discloses a breakaway hose coupling intended to be provided in a hose supplying fuel to a fuel dispensing nozzle 18. The Klop et al. device includes two valves at the interface and shear pins 74 which shear when a force above a preset level is applied thereto, whereupon the valves close. The present invention differs from the teachings of Klop et al. as contemplating incorporating an emergency shut-off valve within the dispensing nozzle itself.

U.S. Pat. No. 4,728,076 to Ganshorn et al. discloses a pressure discharge apparatus including a fluid coupling having a ball 51 held open through engagement with a protrusion 83, 86, which ball 51 closes when the halves are separated. The present invention differs from the teachings of Ganshorn et al. as contemplating incorporation of an emergency shut-off valve within a fuel dispensing nozzle.

U.S. Pat. No. 4,911,203 to Garms discloses a fluid coupling designed to be incorporated into a pressurized fuel line and which includes a ball valve 42 biased in a direction of closure against a seat 44 and held open when a coupling is made as shown in FIG. 2 of Garms by a protruding member 55. Again, the present invention differs from the teachings of Garms as including an emergency shut-off valve incorporated into a dispensing nozzle of a fuel supplying device.

U.S. Pat. No. 5,099,870 to Moore et al. discloses an emergency valve designed to shut-off the flow of fuel in the event a fuel dispenser is struck with sufficient force to rupture the fuel conduit means therefor. The Moore et al. device includes a weakened area 80 in the housing thereof which, when a force above a design level is placed thereon, breaks thereby releasing an arm 40 and allowing the valves 50 and 20 to close. The present invention differs from the teachings of Moore et al. as contemplating incorporation of an emergency shut-off valve into an existing gasoline nozzle and as including means for holding the emergency shut-off valve in an open position internally of the nozzle.

SUMMARY OF THE INVENTION

The present invention relates to a gasoline nozzle with retrofitted emergency shut-off valve. The present invention includes the following interrelated objects, aspects and features:

(A) In a first aspect, the present invention is intended to be installed into an existing gasoline dispensing nozzle having a handle assembly and a nozzle assembly coupled thereto. The inventive shut-off valve is interposed between the handle assembly and nozzle assembly.

(B) The inventive emergency shut-off valve has a housing having a proximal end and a distal end. The proximal end has an outer configuration shaped like the outer configuration of the proximal end of the nozzle assembly so that the proximal end of the emergency shut-off valve housing may be suitably coupled to the distal end of the handle assembly. Similarly, the distal end of the emergency shut-off valve housing has an inner configuration corresponding to the inner configuration of the distal end of the handle assembly thereby allowing this housing to be easily coupled to the proximal end of the nozzle assembly.

(C) The emergency shut-off valve housing contains a valve chamber having a reciprocating valve guided by a stem received in an opening of a spider-like valve stem guide, with the valve head being spring biased in a downstream direction of fluid flow. The proximal end of the nozzle assembly is modified through addition of a proximally extending protrusion designed to hold the valve head spaced from its seat when the nozzle assembly is assembled to the emergency shut-off valve housing.

(D) A sleeve is fitted around the proximal end of the nozzle assembly and the periphery of the emergency shut-off valve housing to hold the nozzle assembly in assembled relation to the emergency shut-off valve housing with the valve head in the open position. The sleeve has a weakened area designed to fail when force above a design force is applied thereagainst. When the sleeve fails, the nozzle assembly may separate from the valve housing whereupon the above-described protrusion is released from the valve head causing the spring biasing the valve head to bias the valve head against the valve seat, thereby instantaneously terminating flow of fuel.

(E) The valve housing has passageways therethrough, as will be described in greater detail hereinafter, to (1) allow use of a vapor recovery system, and (2) to convey fluid pressure from a sensor at the distal end of the nozzle to a diaphragm contained within the handle assembly, which diaphragm forms a part of an actuator for the handle shut-off mechanism designed to shut-off a fuel supply valve contained within the handle assembly when the sensor senses that the fuel tank is full.

(F) Two embodiments of a vapor recovery subassembly are disclosed, one of which utilizes a bellows and the other of which uses a flexible housing having a fluted distal end.

As such, it is a first object of the present invention to provide a gasoline nozzle with retrofitted emergency shut-off valve.

It is a further object of the present invention to provide such a device incorporated within the dispensing nozzle of a fuel supply system.

It is a still further object of the present invention to provide such a device including an emergency shut-off valve biased in a distal direction by a spring and held open by a protrusion on the proximal end of the nozzle assembly.

It is a yet further object of the present invention to provide such a device including a sleeve holding the nozzle assembly to the valve housing, which sleeve includes a weakened area which will fail when a force above a predetermined minimum force is applied thereon, to allow the nozzle assembly to be released from the valve housing causing the valve to be closed.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
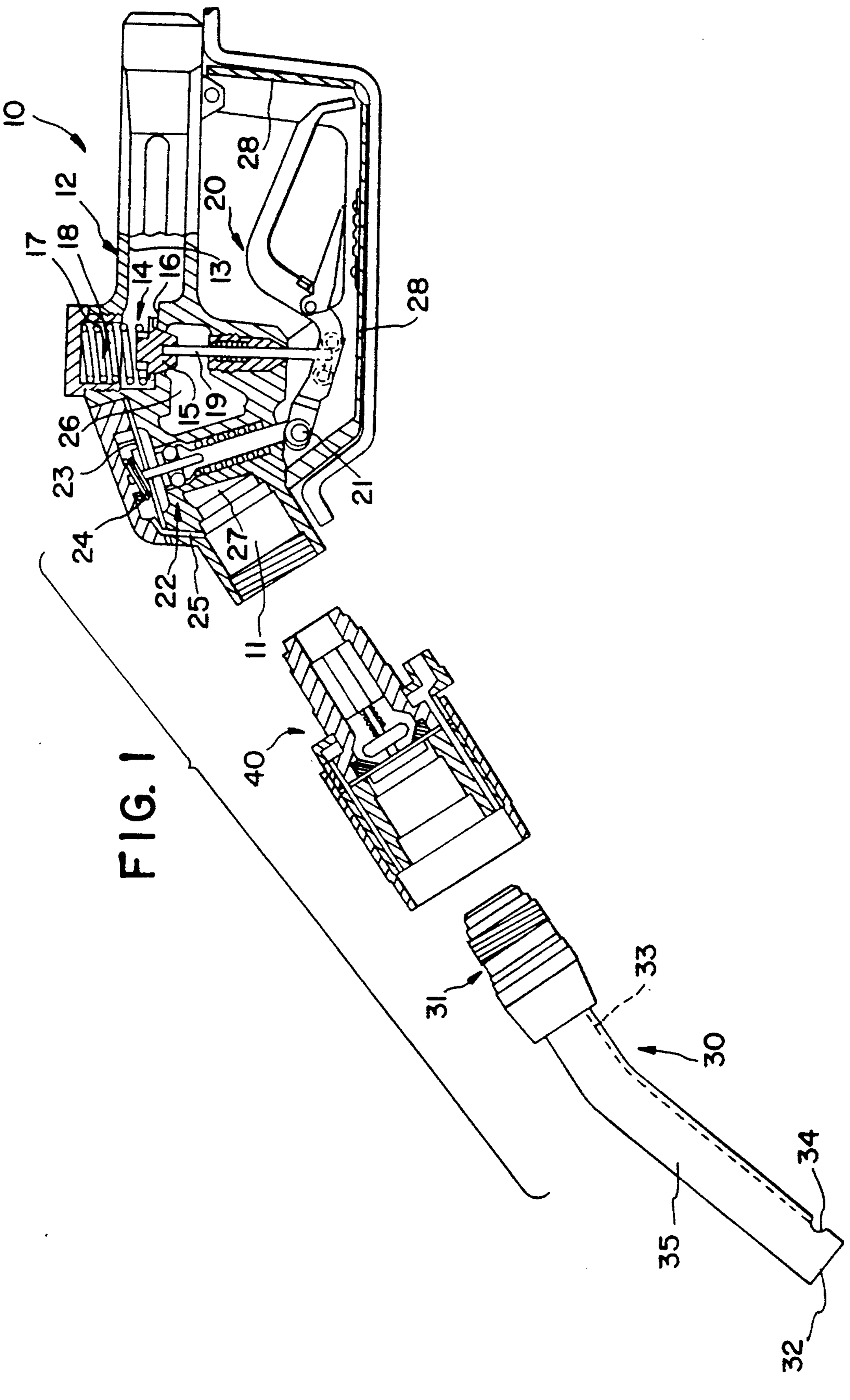
FIG. 1 shows an exploded partial cross-sectional view through the inventive device as associated with an existing fuel dispensing nozzle.
Figure 2:
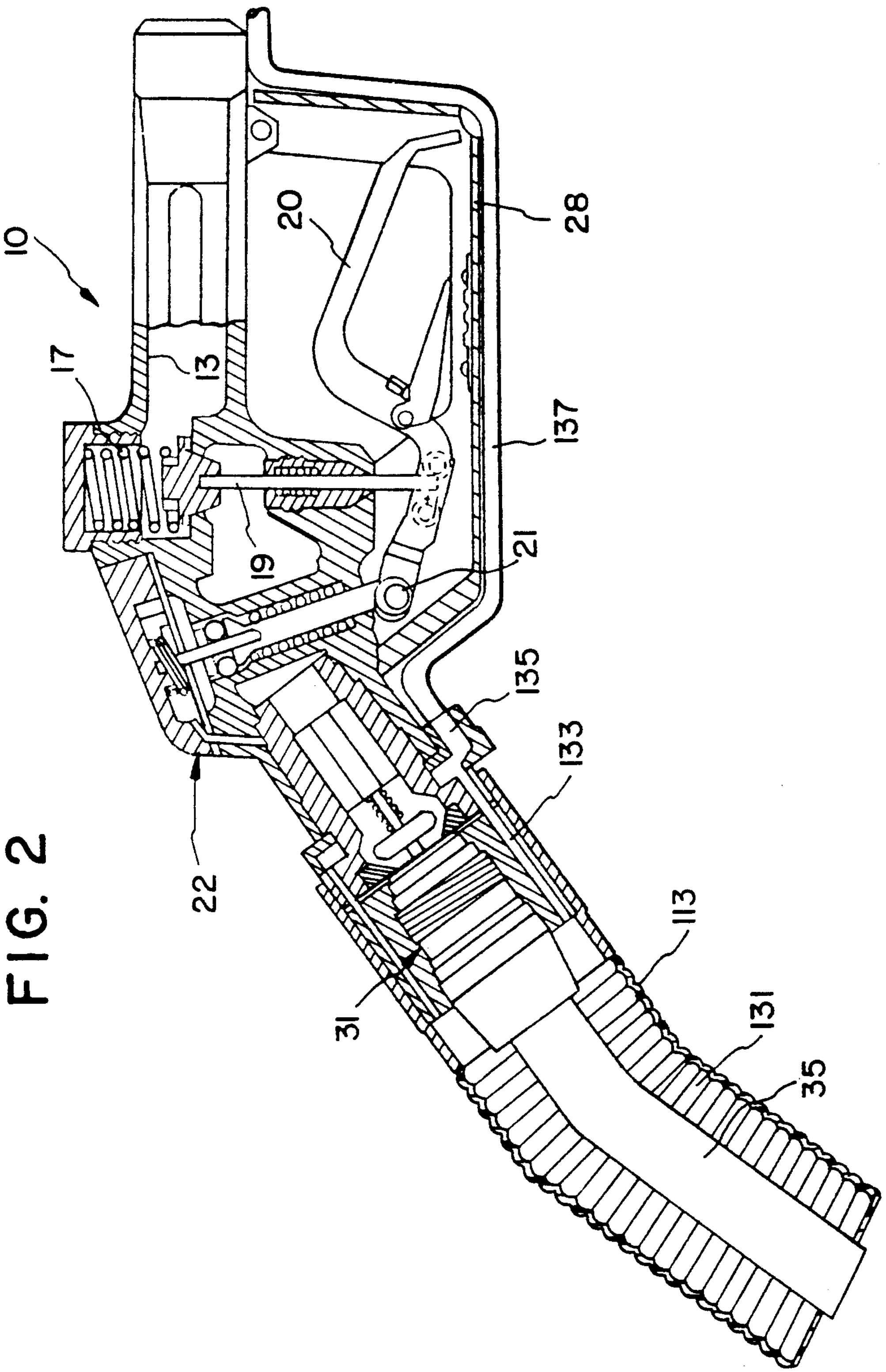
FIG. 2 shows a view similar to that which is shown in FIG. 1 but with the parts assembled together.

With reference, first, to FIGS. 1 and 2, a conventional fuel dispensing nozzle includes a handle assembly 10 and a nozzle assembly 30. As best seen in FIG. 1, the handle assembly 10 includes a female recess 11 having an internal configuration specifically designed to have coupled thereto the proximal male end 31 of the nozzle assembly 30. The complementary coupling surfaces 11 and 45 may, if desired, be threaded. Otherwise, any suitable means may be employed to retain the surfaces 11 and 45 suitably coupled together. The inventive retrofitted emergency shut-off valve is generally designated by the reference numeral 40 as best seen in FIG. 1.

With further reference to FIGS. 1 and 2, the handle assembly 10 is seen to include a housing 12 having a fluid passageway 13 leading to a valve chamber 14 containing an on-off valve 15 biased in a direction of closing against the seat 16 by a compression spring 17 contained within the spring chamber 18. A valve stem 19 is connected to a handle 20 as shown in FIGS. 1 and 2, whereby the user may pivot the handle 20 about the pivot 21 to reciprocate the stem 19 and open the valve 15. A handle guard 28 surrounds and protects the handle 20. When the handle 20 is released, and pivots to the position shown in FIGS. 1 and 2, the spring 17 moves the valve 15 to the seated position shown in FIGS. 1 and 2.

With further reference to FIGS. 1 and 2, an overflow shut-off system generally designated by the reference numeral 22 is provided to automatically cause closure of the valve 15 when fuel in a tank which is being filled by the conventional handle 10, nozzle assembly 30 combination is full. The system 22 includes a diaphragm 23 biased in a downward direction in the view of FIGS. 1 and 2 by a spring 24, and a sensing passage 25 which conveys pressure signals from a conduit 33 shown in phantom in FIG. 1 which terminates at a port 34 just proximal of the distal end 32 of the nozzle 35. The system 22 is conventional in fuel dispensing nozzles and is described, in detail in prior U.S. Pat. No. 5,004,023, in FIG. 1 thereof, with accompanying written description being found at column 2 beginning at line 62 through column 3, line 29.

With further reference to FIG. 1, downstream of the valve 15, a passageway 26 fluidly connects with the upstream passageway 13 and connects downstream around the system 22 with a port 27 which normally fluidly connects with the proximal end of the nozzle assembly 30 but, in accordance with the teachings of the present invention, instead connects with the proximal end of the valve assembly 40 as will be described in greater detail hereinafter.

Figure 3:
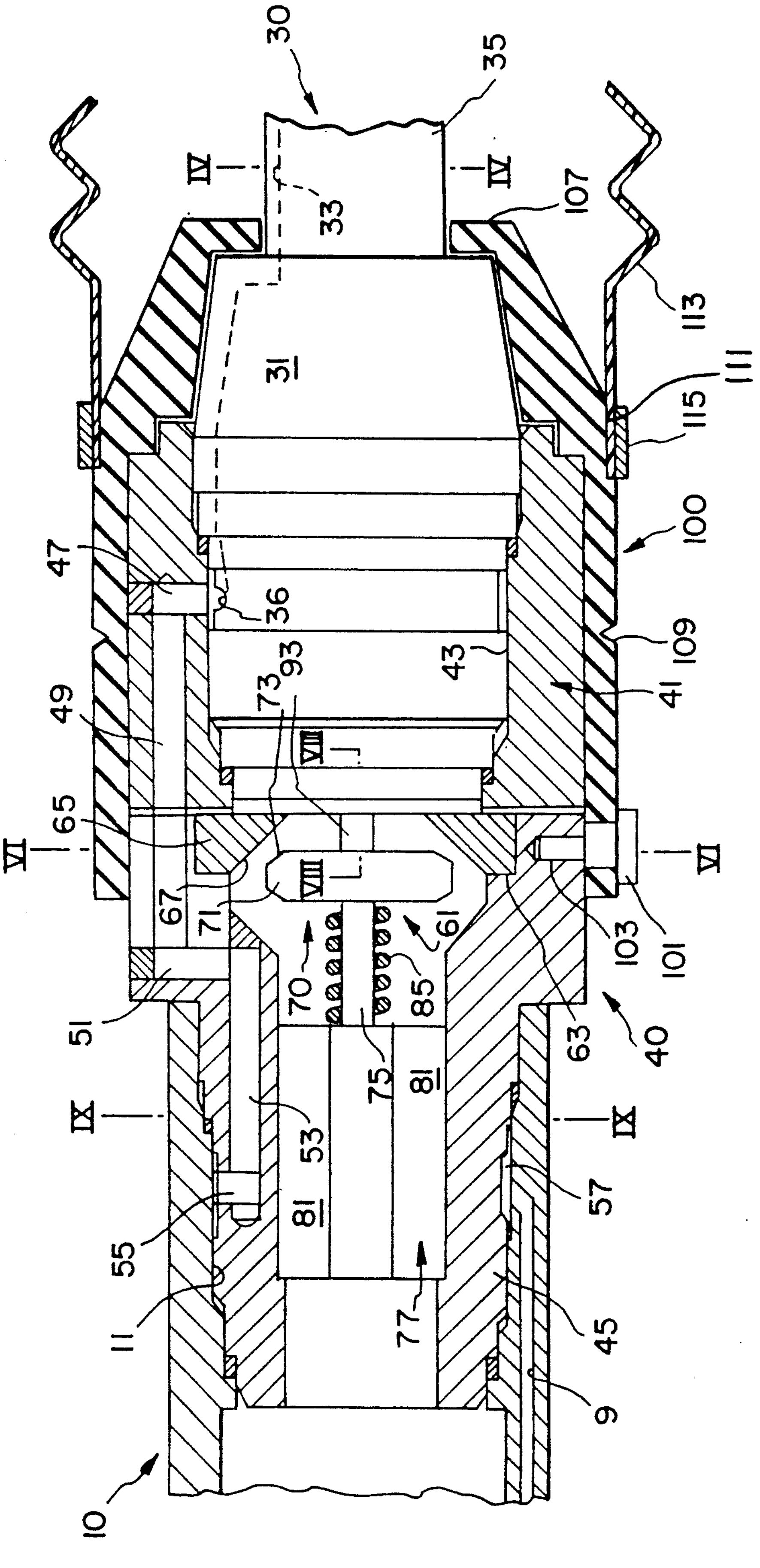
FIG. 3 shows an enlarged cross-sectional view through the inventive valve housing with portions of the dispensing nozzle and handle assembly being shown for detail.
Figure 4:
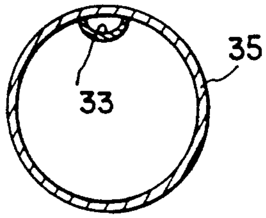
FIG. 4 shows a cross-sectional view along the line IV—IV of FIG. 3.

With particular reference, now, to FIG. 3, the inventive retrofitted emergency shut-off valve is generally designated by the reference numeral 40, and includes a housing 41 having a stepped recess 43 designed to receive the substantially corresponding proximal male end 31 of the nozzle assembly 30. The housing 40 also includes a male protruding proximal end 45 having a stepped outer periphery specifically designed to be received in a coupling fashion within the female recess 11 of the handle assembly 10. As should be understood, the male protuberance 45 of the inventive housing 41 has an outer configuration similar in configuration to the proximal end 31 of the nozzle assembly 30, so that the protuberance 45 may be received in a complimentary manner within the female recess 11 of the handle assembly 10.

With particular reference to FIGS. 1 and 3, it is seen that the housing 40 provides fluid connection between the sensing passageway 33 in the nozzle 35 and the passageway 25 fluidly connected to the back side of the diaphragm 23 (FIG. 1). In this regard, as seen in FIG. 3, the sensing passageway 33 in the nozzle 35 continues in the proximal direction to an orifice 36 which aligns with a port 47 fluidly connected with a longitudinal passageway 49 connected to a further longitudinal passageway 53 via a perpendicular short passageway 51.

The passageway 53 connects with a further short right angle passageway 55 which fluidly connects with an annular recess 57 which fluidly connects with a passageway 9 in the handle assembly 10, which passageway 9 fluidly connects with the passageway 25 shown in FIG. 1. In this way, the sensing passageway 33 fluidly connects with the sensing passageway 25 in the same manner and with the same effectiveness as if the valve assembly 40 was not employed.

Figure 9:
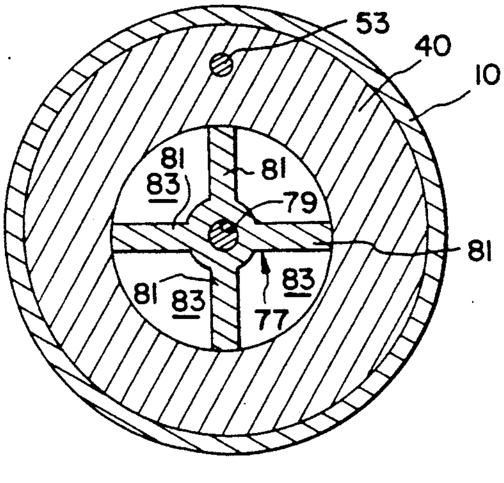
FIG. 9 shows a cross-sectional view along the line IX—IX of FIG. 3.

With further reference to FIG. 3, in particular, it is seen that the housing 41 has a valve chamber 61 having a shoulder 63 against which is engaged a valve seat 65 having a conical valve head engaging surface 67. The valve assembly 70 includes a valve head 71 having a conical valving surface 73 complimentary to the surface 67 of the valve seat 65. The valve assembly 70 further includes a guiding stem 75 guidingly received within an opening 79 of a spider-like guiding assembly 77 (FIG. 9) having outwardly extending legs 81 defining chambers 83 therebetween permitting fluid flow around the device 77. A compression spring 85 surrounds the valve stem 75 and engages between a distal end of the guiding device 77 and a proximal face of the valve head 71 to bias the valve head 71 in a direction of engagement against the valve seat 65.

Figure 7:
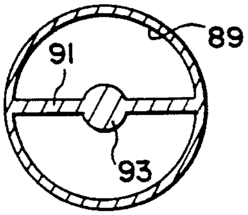
FIG. 7 shows a view looking distally of the proximal end of the nozzle assembly.
Figure 8:
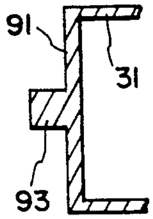
FIG. 8 shows a cross-sectional view along the line VIII—VIII of FIG. 3.

With reference to FIGS. 3, 7 and 8, the proximal end 31 of the nozzle assembly 30 has an opening 89 fluidly connecting with the valving chamber 61 when the nozzle assembly 30 is coupled to the valve assembly 40. A support device 91 extends across the opening 89 and supports a protrusion 93 which, as best seen in FIG. 3, engages the valve head 71 when the nozzle assembly 30 is coupled to the valve assembly 40 as shown in FIG. 3 to hold the valve 71 in the open position shown.

Figure 6:
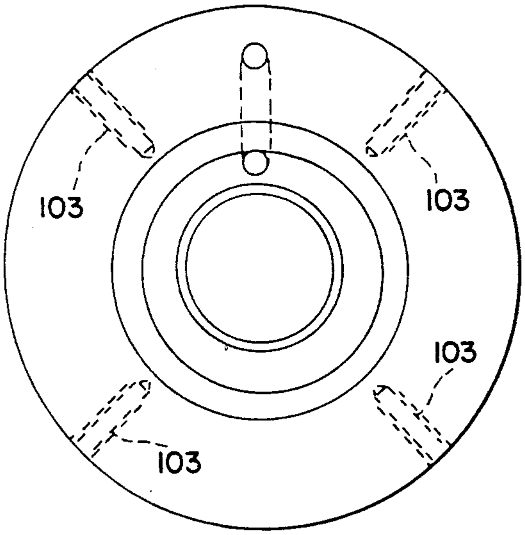
FIG. 6 shows a cross-sectional view along the line VI—VI of FIG. 3.

With further reference to FIG. 3, in particular, a sleeve 100 preferably made of a material such as plastic may be slid over the outer periphery of the housing 41 and may be retained in mounted position by a plurality of threaded fasteners 101 threadably received within recesses 103 formed in the body 41. The recesses 103 are best seen with reference to FIG. 6.

Referring back to FIG. 3, the sleeve 100 includes a radially inwardly extending terminus 10 sized and configured to capture the proximal portion 31 of the nozzle assembly 30 and retain it in the mounted position shown in FIG. 3, in particular. The sleeve 100 includes a weakened portion of V-shaped cross-section designated by the reference numeral 109. This weakened portion 109 is designed to fail when forces above a design threshold are placed upon the nozzle 35, for example, by the driver of a vehicle driving away from a service station with the nozzle 35 remaining within the gas tank entry way of the vehicle. When such failure occurs, the nozzle assembly 30 will separate from the valve assembly 40, thereby removing the protrusion 93 from engagement with the valve head 71 allowing the spring 85 to instantaneously move the valve head 71 to the seated position with the surface 73 of the valve head 71 sealingly engaging the surface 67 of the valve seat 65 to instantaneously cut off flow of fuel through the valve assembly 40.

With further reference to FIG. 3, it is seen that the sleeve 100 includes an annular recess 111 sized to receive the proximal end of a vapor recovery bellows 113 which is clamped on the recess 111 through the use of a clamping band 115. Alternatively, instead of the bellows 113, with reference to FIG. 5, a vapor recovery sleeve 120 having a smooth proximal end 121 and a longitudinally fluted distal end 123 may be employed. The proximal end 121 of the fluted vapor recovery device 120 illustrated in FIG. 5 may be coupled over the sleeve 100 in the same manner as the bellows 113 as seen in FIG. 3.

With the above description, the operation of the present invention in its embodiments should be understood. With reference to FIG. 1, the handle assembly 10 is disassembled from the nozzle assembly 30 and the inventive emergency shut-off valve 40 is interposed therebetween as shown in FIG. 2. If the coupling portion 11 is threaded, the coupling portion 45 is correspondingly threaded. The coupling portion 31 is slidably received within the recess 43 of the valve housing 41 and is retained therein by engagement of the sleeve 100 portion 107 over the nozzle coupling portion 31 shoulder (FIG. 3) and by the threaded fasteners 101 received within threaded recesses 103. As shown in FIG. 2, with the inventive device so assembled, the chamber 131 formed between the bellows 113 and the nozzle 35 communicates with a vapor receiving tank (not shown) via the passageway 133 in the valve housing, the coupling 135 in the valve housing, and the tube 137 extending around the handle guard 28 of the handle assembly 10.

When the handle 20 is squeezed and pivoted about the pivot 21, fuel flows from a source of fuel (not shown) through the passageway 13 past the valve 15, through the chamber 26 and past the shut-off device 22, through the port 27 and into the valve housing 41, past the open valve 71 which has been maintained in the open position through engagement by the protrusion 93 at the proximal end of the nozzle assembly 30. Fuel flows therepast and through the male portion 45 of the housing 40 and thence into the nozzle 35 where it is dispensed into a fuel tank.

Figure 5:
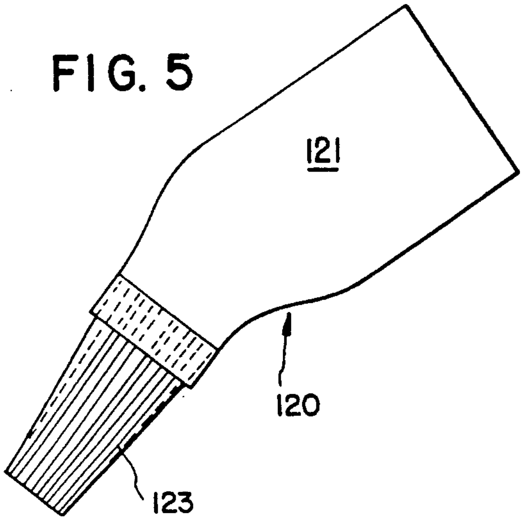
FIG. 5 shows a side view of a vapor recovery device having a fluted distal end.

Vapors which are displaced from the tank by fuel filling the tank are conveyed into the chamber 131 between the nozzle 35 and the bellows 113, or alternatively, the fluted vapor recovery device 120 shown in FIG. 5, and are conveyed through the passageway 133, the port 135 and the passageway 137 to a vapor recovery tank (not shown).

Meanwhile, the port 34 defining the distal termination of the passageway 33 conveys sensed information, such as vacuums, to the back side of the diaphragm 23 of the system 22 via the port 36, the passageways 47, 49, 51, 53 and 55, the recess 57 and the passageway 9 which fluidly connects with the sensing passageway 25. In this way, as explained in prior U.S. Pat. No. 5,004,023, when the tank has been filled, the system 22 is activated to shut-off the valve 15.

If, during or at the conclusion of filling, a force is placed on the sleeve 100 by, for example, the driver of the vehicle driving off without removing the nozzle 35 from the fuel tank entrance, the weakened area 109 of the sleeve 100 will fail releasing the distal end of sleeve 100 and allowing the nozzle assembly 30 to remove itself from the valve assembly 40 housing 41. When this occurs, the protrusion 93 is also removed along with the nozzle assembly 30 and the spring 85 instantaneously pushes the valve 71 to a seated position seating against the valve seat 65. In this way, spillage of fuel is prevented.

As such, an invention has been disclosed in terms of preferred embodiments thereof which fulfill each and every one of the objects of the invention as set forth hereinabove and provides a new and useful gasoline retrofitted emergency shutoff valve of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. In an existing fuel dispensing nozzle device having an existing handle assembly with a distally located coupling portion and an existing nozzle assembly with a proximally located coupling portion complementary to said distally located coupling portion of said handle assembly and normally coupled thereto, the improvement comprising an emergency shut-off valve retrofitted and interposed between said existing handle assembly and said existing nozzle assembly and comprising:

a) a valve housing having a proximal end and a distal end, said proximal end having a first coupling complementary to said handle assembly coupling portion and configured to be coupled thereto and said distal end having a second coupling complementary to said nozzle assembly coupling portion and configured to be coupled thereto;

b) said valve housing having a flow passageway therethrough including a valve chamber having a valve seat, and a valve head resiliently biased by biasing means toward said valve seat in a direction of fluid flow;

c) means for holding said valve head spaced from said seat against force of said biasing means so long as said nozzle assembly is coupled to said valve housing second coupling;

d) means for retaining said nozzle assembly coupled to said valve housing, including a sleeve for overlying a portion of said valve housing and said nozzle assembly coupling portion, said retaining means including a region deigned to fail when force above a threshold is placed thereon;

e) whereby, with said valve coupled between said existing handle assembly and existing nozzle assembly, when said force is placed on said region, said region fails causing said retaining means to release said nozzle assembly from said valve housing, said holding means concurrently releasing causing said biasing means to close said valve head against said valve seat.

2. The invention of claim 1, wherein said biasing means comprises a spring.

3. The invention of claim 2, wherein said valve head has a guide stem extending through said spring.

4. The invention of claim 1, wherein said valve seat has a truncated conical valve head engaging surface.

5. The invention of claim 1, wherein said holding means comprises a proximally facing protrusion disposed on said nozzle assembly coupling portion.

6. The invention of claim 1, wherein said region comprises a thinned annulus on said sleeve.

7. The invention of claim 6, wherein said thinned annulus is of V-shape cross-section.

8. The invention of claim 6, wherein said sleeve is fixed to said valve housing at a proximal end of said sleeve.

9. The invention of claim 8, wherein said sleeve is fixed to said valve housing by at least one threaded fastener extending through said sleeve and received in said valve housing.

10. The invention of claim 9, wherein said thinned annulus is distal of said at least one threaded fastener.

11. The invention of claim 1, wherein said fuel dispensing nozzle device includes a manually controlled fuel valve contained within said handle assembly and including an automatic over flow shut-off system having a sensing passage having a first portion within said handle assembly and a second portion within said nozzle assembly terminating in a sensing port, said valve housing having a flow conduit fluidly connecting said first and second portions of said sensing passage when said valve housing is interposed between said handle assembly and said nozzle assembly.

12. The invention of claim 1, wherein said, fuel dispensing nozzle device includes a vapor recovery system including a hood surrounding said nozzle assembly and defining an annular chamber therearound, a first conduit in said nozzle assembly fluidly connecting said annular chamber to a second conduit in said handle assembly connected to storage means for fuel vapors, said valve housing including a third conduit fluidly connecting said first conduit and said second conduit when said valve housing is interposed between said handle assembly and said nozzle assembly.

13. The invention of claim 12, wherein said hood comprises a bellows.

14. The invention of claim 12, wherein said hood includes a smooth proximal end and a longitudinally fluted distal end.

15. The invention of claim 12, wherein said hood is secured about said retaining means.

* * * * *